US010756839B1

(12) United States Patent
Cheung et al.

(10) Patent No.: US 10,756,839 B1
(45) Date of Patent: Aug. 25, 2020

(54) HYBRID COARSE WAVELENGTH DIVISION MULTIPLEXING (CWDM) TRANSCEIVER

(71) Applicant: Hewlett Packard Enterprise Development LP, Houston, TX (US)

(72) Inventors: Stanley Cheung, Palo Alto, CA (US); Michael Tan, Palo Alto, CA (US); Sagi Mathai, Palo Alto, CA (US); Wayne Victor Sorin, Palo Alto, CA (US); Paul Rosenberg, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/408,350

(22) Filed: May 9, 2019

(51) Int. Cl.
*H04B 10/00* (2013.01)
*H04J 14/02* (2006.01)
*H04B 10/40* (2013.01)
*H04B 10/2507* (2013.01)

(52) U.S. Cl.
CPC .......... *H04J 14/02* (2013.01); *H04B 10/2572* (2013.01); *H04B 10/40* (2013.01)

(58) Field of Classification Search
USPC ............................................ 398/164; 385/15
See application file for complete search history.

(56) References Cited

U.S. PATENT DOCUMENTS

| | | | | |
|---|---|---|---|---|
| 5,894,535 A * | 4/1999 | Lemoff | ................... | G02B 6/125 385/14 |
| 6,049,641 A * | 4/2000 | Deacon | ............... | H04Q 11/0005 385/15 |
| 6,325,553 B1 * | 12/2001 | Deacon | ............... | H04Q 11/0005 385/15 |
| 6,527,456 B1 * | 3/2003 | Trezza | ..................... | G02B 6/43 385/116 |
| 6,754,405 B2 * | 6/2004 | Vendier | .................... | G02B 6/43 385/14 |
| 6,870,976 B2 * | 3/2005 | Chen | .................. | G02B 6/29367 264/1.1 |
| 7,104,703 B2 * | 9/2006 | Nagasaka | ............ | G02B 6/4204 355/52 |

(Continued)

OTHER PUBLICATIONS

Sorin et al., "Converting a multimode fiber into a single-mode fiber", IEEE Photonics Society Summer Topical Meeting Series, Jul. 8-10, 2013.

(Continued)

*Primary Examiner* — Agustin Bello
(74) *Attorney, Agent, or Firm* — Sheppard Mullin Richter & Hampton LLP

(57) ABSTRACT

A hybrid optical transceiver is provided. An optical component disposed on a substrate, the optical component comprising a transmitter section and a receiver section. Transmitter section comprises a plurality of vertical cavity surface emitting laser (VCSEL) arrays communicatively coupled to a plurality of multiplexers, configured to launch multiplexed optical signals into the lowest order mode group of a multimode fiber or the lowest order mode of a single mode fiber. Receiver section comprises a photodetector array comprising a plurality of optical detectors, and configured to receive demultiplexed optical signals of unknown polarization without routing waveguides. In various embodiments, each section being independently removable from a substrate.

20 Claims, 14 Drawing Sheets

(56) References Cited

U.S. PATENT DOCUMENTS

| | | | |
|---|---|---|---|
| 7,366,371 B1* | 4/2008 | Wen | G02B 6/4214 385/15 |
| 7,609,922 B2* | 10/2009 | Aoki | G02B 6/4284 385/49 |
| 8,197,147 B2* | 6/2012 | Lee | G02B 6/4204 372/50.23 |
| 8,358,892 B2* | 1/2013 | Oda | G02B 6/4214 385/115 |
| 8,666,204 B2* | 3/2014 | Wu | G02B 6/43 385/14 |
| 8,684,612 B2* | 4/2014 | Kim | G02B 6/425 385/15 |
| 8,687,971 B2* | 4/2014 | Dahlfort | H04B 10/2587 398/142 |
| 8,725,001 B2* | 5/2014 | Fini | G02B 6/02042 398/145 |
| 8,965,203 B1 | 2/2015 | Vahdat et al. | |
| 8,983,248 B2* | 3/2015 | Sorin | G02B 6/32 385/129 |
| 9,429,725 B2* | 8/2016 | Shao | H04B 10/40 |
| 9,507,111 B2 | 11/2016 | Collins et al. | |
| 9,577,780 B2 | 2/2017 | Welch | |
| 9,910,230 B2* | 3/2018 | Zhang | G02B 6/4206 |
| 10,020,888 B1* | 7/2018 | Aybay | H04B 10/671 |
| 2005/0089268 A1* | 4/2005 | Chen | G02B 6/2938 385/24 |
| 2006/0008199 A1* | 1/2006 | Glebov | G02B 6/322 385/15 |
| 2006/0056763 A1* | 3/2006 | Xu | G02B 6/4249 385/33 |
| 2006/0291771 A1* | 12/2006 | Braunisch | G02B 6/4224 385/15 |
| 2007/0237449 A1* | 10/2007 | Aoki | G02B 6/4292 385/14 |
| 2008/0008472 A1* | 1/2008 | Dress | H04B 10/803 398/66 |
| 2009/0317035 A1* | 12/2009 | Aoki | G02B 6/4292 385/49 |
| 2010/0014806 A1* | 1/2010 | Lee | G02B 6/4204 385/15 |
| 2010/0028018 A1* | 2/2010 | Tan | G02B 6/43 398/141 |
| 2010/0104289 A1* | 4/2010 | Ogura | H04B 10/505 398/82 |
| 2010/0158067 A1* | 6/2010 | Nakatsuka | G02B 6/4206 372/50.124 |
| 2010/0215313 A1* | 8/2010 | Matsuoka | G02B 6/43 385/14 |
| 2011/0206379 A1* | 8/2011 | Budd | H04B 10/801 398/116 |
| 2012/0002284 A1* | 1/2012 | McColloch | G02B 6/4206 359/558 |
| 2012/0063787 A1* | 3/2012 | Yagisawa | H04B 10/801 398/164 |
| 2012/0082413 A1* | 4/2012 | Alameh | G02B 6/4249 385/24 |
| 2012/0163811 A1* | 6/2012 | Doany | G02B 6/43 398/41 |
| 2013/0259483 A1* | 10/2013 | McLaren | H04B 10/278 398/79 |
| 2013/0336664 A1* | 12/2013 | Mack | H04B 10/503 398/184 |
| 2014/0099120 A1* | 4/2014 | Sorin | G02B 27/123 398/79 |
| 2014/0314422 A1* | 10/2014 | Shao | H04B 10/40 398/138 |
| 2015/0071638 A1* | 3/2015 | Heroux | H04B 10/2504 398/79 |
| 2015/0338578 A1* | 11/2015 | Bickham | G02B 6/26 385/15 |
| 2017/0288770 A1 | 10/2017 | Mentovich et al. | |
| 2017/0310075 A1 | 10/2017 | Debnath et al. | |

OTHER PUBLICATIONS

Sorin et al., "Interoperability of single-mode and multimode data links for data center and optical backplane applications", Optical Fiber Communication Conference, Mar. 17-21, 2013, pp. 1-3.

Beausoleil, R.; "Large-Scale Integrated Photonics for High-Performance Interconnects"; Jun. 2011; 54 pages.

* cited by examiner

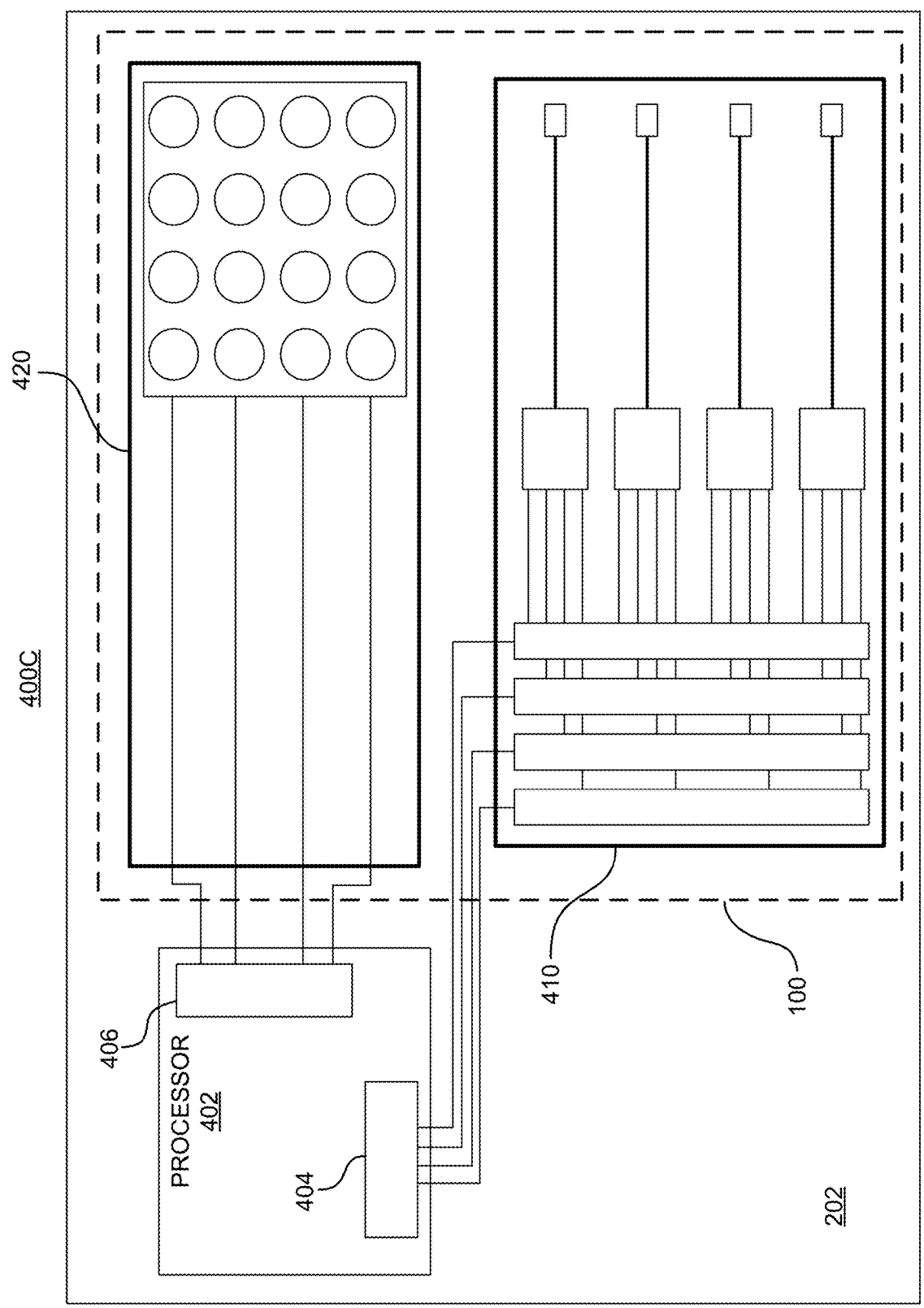

700A

700B

HYBRID COARSE WAVELENGTH DIVISION MULTIPLEXING (CWDM) TRANSCEIVER

BACKGROUND

Optical communication systems are increasingly used within data centers for exchanging data between network devices. Unlike traditional electrical cables, optical fibers are less susceptible to electromagnetic interference and enables higher transmission speeds over longer distances. Generally, two types of optical cables are utilized for optical data transmission: single-mode fiber cables (SMF) and multimode fiber cables (MMF). Regardless of the optical cable utilized, the optical signal is subject to distortion, through modal dispersion (in MMFs), material dispersion, polarization mode dispersion, and waveguide dispersion (SMFs and MMFs).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Some of the figures included herein illustrate various embodiments of the invention from different viewing angles. Although the accompanying descriptive text may refer to elements depicted therein as being on the "top," "bottom" or "side" of an apparatus, such references are merely descriptive and do not imply or require that the invention be implemented or used in a particular spatial orientation unless explicitly stated otherwise.

FIG. 4C illustrates another example hybrid transceiver in accordance with embodiments of the technology disclosed herein.

The figures are not exhaustive and do not limit the present disclosure to the precise form disclosed.

DETAILED DESCRIPTION

Embodiments of the present disclosure are directed to a hybrid optical transceiver and accompanying system for use in data transmission. The hybrid optical transceiver includes an optical component having two sections, a receiver section and a transmitter section. The transmitter section includes a plurality of flipped, vertical cavity surface emitting lasers (VCSELs) optically coupled to waveguides and other transmission optics, configured to couple the light output by each VCSEL into each one of a plurality of on-chip multiplexers. After multiplexing the different signals from each VCSEL into a waveguide, launching optics are provided to launch the output from each on-chip single-mode multiplexer into the lowest-order mode group in a multimode fiber or the lowest order mode in a single mode fiber. The receiver section is configured to eliminate the need for polarization diversity at the receiver. A surface illuminated photodetector array is provided, comprising a plurality of lenses to focus received, unpolarized light or light with unknown state of polarization into a plurality of optical detectors. A zig-zag demultiplexer is included, which separates the various wavelengths within the received multiplexed signal. A number of CWDM filters are spaced and configured such that only one wavelength may pass, while other wavelengths are reflected. In this way, each modulated wavelength (i.e., corresponding to a light signal from a particular VCSEL) is demultiplexed and conditioned for use by the optical detectors. Moreover, the zig-zag demultiplexer is polarization-independent, capable of handling unpolarized light or light with unknown state of polarization received optical signals, eliminating the need for polarization-dependent waveguides or other routing structures to route demultiplexed signals to the photodetector array. Accordingly, embodiments of the technology disclosed herein may be used to increase the effective distance of MMFs by launching only into the lowest-order mode group, as well as providing a flexible hybrid transceiver.

Figure 1A:
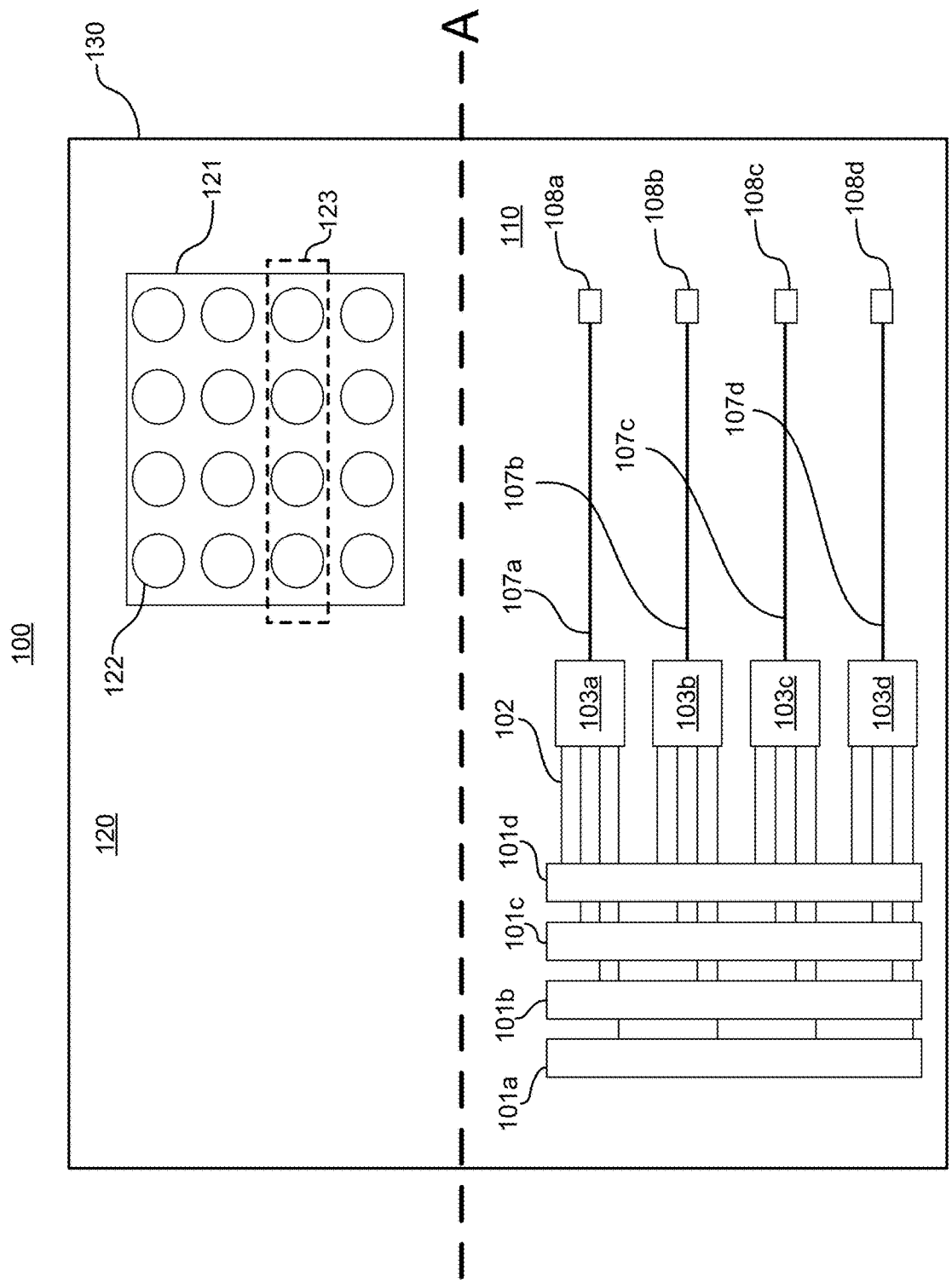
FIG. 1A illustrates an example optical component in accordance with embodiments of the technology disclosed herein.
Figure 1B:
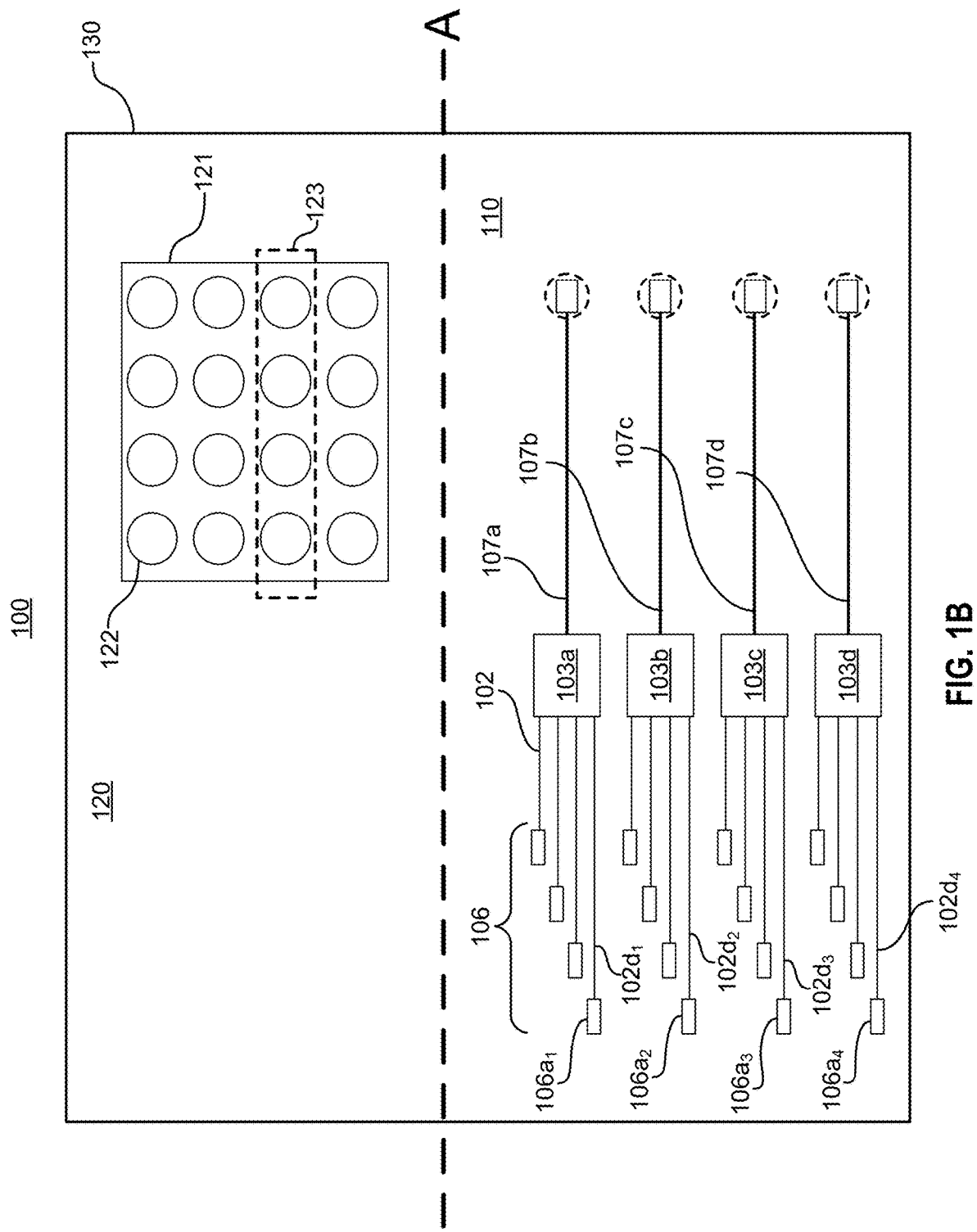
FIG. 1B illustrates the example optical component of FIG. 1A with VCSEL arrays removed.

FIGS. 1A and 1B illustrate an example optical component 100 in accordance with embodiments of the present disclosure. Optical component 100 may be implemented within an optical transceiver module. In various embodiments, optical component 100 may be a separate chip that may be connected to other chips and/or processing boards to provide optical connectivity, while in other embodiments optical component 100 may be an incorporated into a single integrated circuit (e.g., switch-on-a-chip (SOC)). In other embodiments, optical component 100 may comprise one or more chips or integrated circuits (e.g., example optical component 100 illustrated in FIG. 4B). Although discussed with respect to FIGS. 1A and 1B, optical component 100 is provided for illustration purposes only and should not be interpreted as limiting the scope of the present disclosure to only the illustrated example. For ease of discussion, optical component 100 omits common devices or elements of similar integrated circuits (e.g., ground traces, vias, etc.), but a person of ordinary skill would know how to include such common devices or element without hindering his or her understanding of the functioning of optical component 100.

As illustrated in FIG. 1A, optical component 100 comprises two sections: transmitter section 110 and receiver section 120. The separation of transmitter section 110 and receiver section 120 shown in FIG. 1A (designated by reference line A) is provided for illustrative purposes only, and should not be interpreted as requiring any hard separation or boundary between the transmitter elements and the receiver elements. As discussed above, optical component 100 may comprise one or more chips. In various embodiments, transmitter section 110 and receiver section 120 may comprise separate chips or integrated circuits that are independently removable from optical component 100 (i.e., independently removable from interposer 130). As shown, transmitter section 110 includes a plurality of VCSEL arrays 101. Each VCSEL array 101 may be configured to modulate light, based on an electrical input, to produce a light signal with a carrier having a specific wavelength. As illustrated, each VCSEL array 101 may be flipped such that, as a non-limiting example, the output of VCSEL array 101a is directed down into interposer 130. In various embodiments, each VCSEL array may be polarization locked, while in other embodiments each VCSEL array 101 may not be locked to operate with only one polarization. VCSEL arrays 101 may be single-mode VCSELs, configured to output a modulated signal in just one mode in various embodiments.

Interposer 130 serves as a chip carrier for each integrated circuit (transmitter section 110 and receiver section 120). In various embodiments, interposer 130 may be made of, but not limited to, silicon, silicon dioxide, aluminum oxide, sapphire, germanium, gallium arsenide, indium phosphide, or an alloy of silicon and germanium, among others. Traces within interposer 130 provides an electrical interface between transmitter section 110 and receiver section 120 to a substrate (not shown in FIG. 1).

The light output by each VCSEL array 101 is optically coupled to a plurality of waveguides 102 configured to route the light from each VCSEL array to each of a plurality of optical multiplexers 103. Optical multiplexers 103 are configured to multiplex the output light signals from each VCSEL array 101 to enable all of the signals to be transmitted through the respective transmit fiber. In various embodiments, under each VCSEL array 101 shown in FIG. 1B are a plurality of optical couplers 106 coupling light output by each VCSEL array 101, through a waveguide 102 to each optical multiplexer 103. Non-limiting examples of optical couplers 106 include coupling mirrors and grating couplers. As a non-limiting example, optical couplers 106$a_1$, 106$a_2$, 106$a_3$, 106$a_4$ of VCSEL array 101a couple the light output from VCSEL array 101a through waveguides 102$d_1$, 102$d_2$, 102$d_3$, 102$d_4$ to each optical multiplexer 103a, 103b, 103c, 103d. Therefore, the output from VCSEL array 101a may be multiplexed onto a multiplexed signal 107a, 107b, 107c, 107d.

In various embodiments, the number of optical multiplexers may be determined based on the number of optical fibers over which the transmitter section 110 is configured to transmit data. Referring to FIG. 1A, transmitter section 110 is configured to transmit over four transmit fibers, therefore four optical multiplexers 103a, 103b, 103c, 103d are provided, each to create a multiplexed signal 107 for each transmit fiber. Non-limiting examples of optical multiplexers 103 applicable with embodiments of the present disclosure include Mach-Zehnder Interferometer (MZI) lattice filters, Echelle gratings, arrayed waveguide gratings (AWGs), ring resonators, or any other optical multiplexer device. In various embodiments, optical multiplexers 103 may be made of silicon nitride or silicon oxynitride.

Figure 7A:
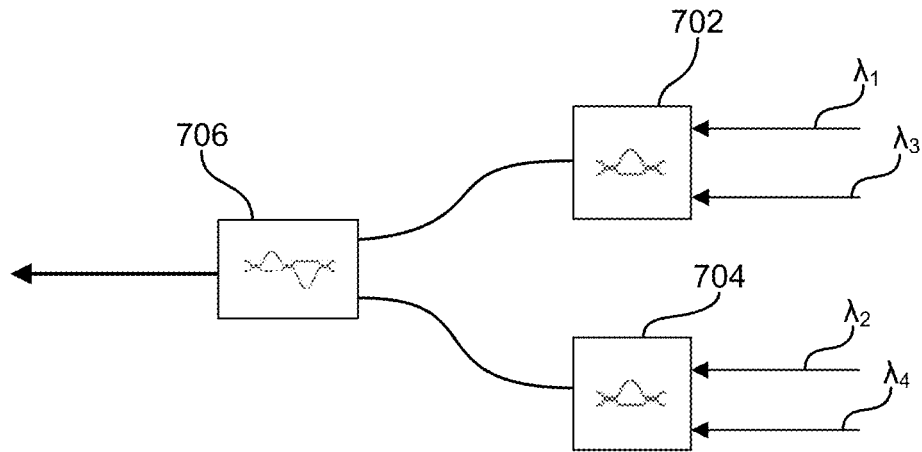
FIG. 7A illustrates an example four-wavelength multiplexer in accordance with embodiments of the technology disclosed herein.
Figure 7B:
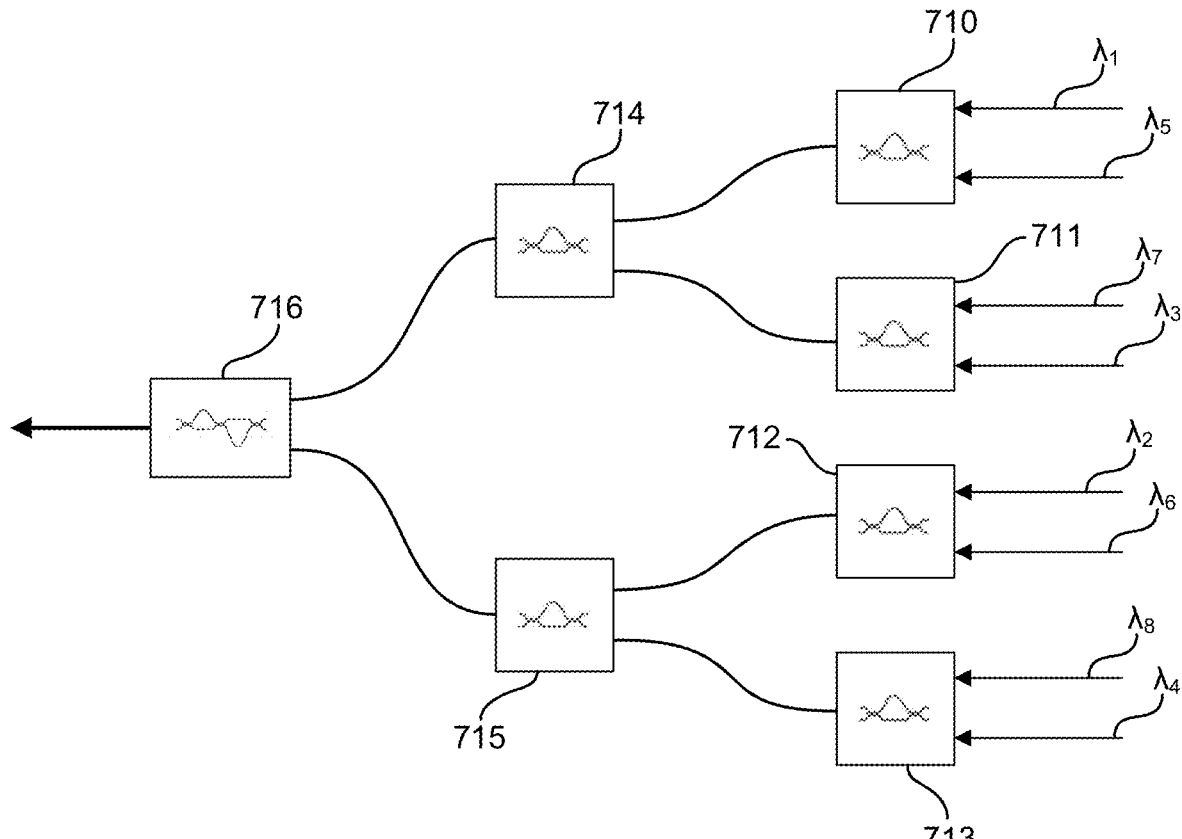
FIG. 7B illustrates an example eight-wavelength multiplexer in accordance with embodiments of the technology disclosed herein.

In various embodiments, optical multiplexers 103a, 103b, 103c, 103d may be designed to multiplex any number of wavelengths into a multiplexed signal. FIGS. 7A and 7B illustrate a four-wavelength multiplexer 700A and an eight-wavelength multiplexer 700B, respectively, in accordance with embodiments of the technology disclosed herein. Four-wavelength multiplexer 700A comprises two one-stage filter, each configured to receive two different wavelengths. As illustrated in FIG. 7A, one-stage filter 702 is configured to receive wavelengths $\lambda 1$, $\lambda 3$, while one-stage filter 704 is configured to receive wavelengths $\lambda 2$, $\lambda 4$. Each one-stage filter 702, 704 output a multiplexed signal combining each of the respective wavelengths into a single optical signal. Each output from one-stage filters 702, 704 serves as inputs to two-stage filter 706. As the two output signals from one-stage filters 702, 704 traverse the two stages of filter 706, the two multiplexed signals are further combined to form a full multiplexed optical signal, having all the relevant wavelengths of light multiplexed onto a single waveguide.

FIG. 7B illustrates an eight-wavelength multiplexer 700B, which contains similar components as four-wavelength multiplexer 700A discussed above. In various embodiments, each filter is configured to accept two inputs and configured to combine the two input signals. Accordingly, an extra level of filters is used to ensure all of the relevant wavelengths are multiplexed together at the output of the optical multiplexer. As illustrated in FIG. 7B, each first level filter comprises four one-stage filters 710, 711, 712, 713, which output multiplexed signals to the inputs of the second level filters, which themselves are another round of one-stage filters 714, 715. The now doubly-multiplexed signals are further combined at the third level through two-stage filter 716.

Although discussed with respect to 1×4 and 1×8 multiplexers, the technology of the present disclosure is not limited to any specific number of wavelengths. A person of ordinary skill in the art would understand that embodiments in accordance with the present disclosure can multiplex any number of wavelengths, limited by system limits.

Figure 8A:
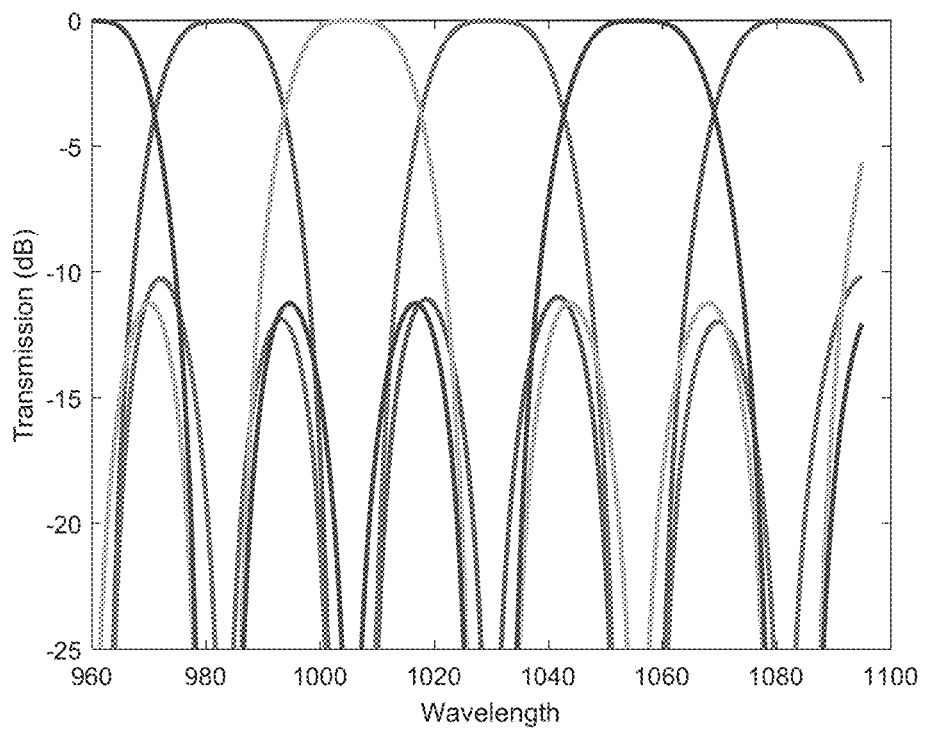
FIG. 8A shows example performance results for an example multiplexer configuration in accordance with embodiments of the technology disclosed herein.
Figure 8B:
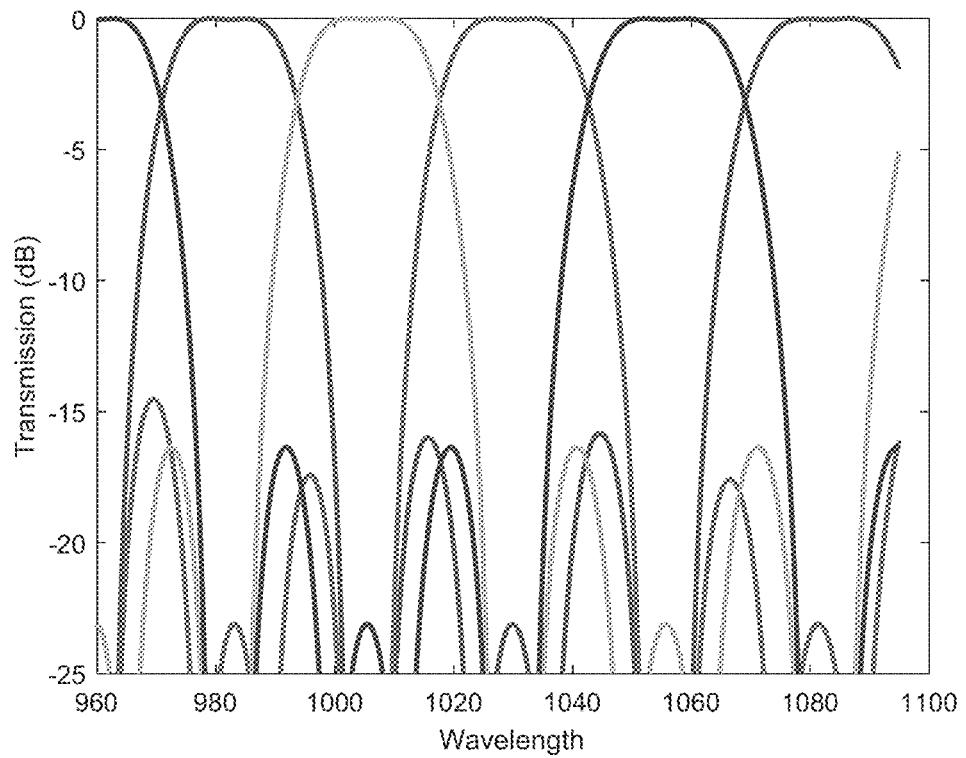
FIG. 8B shows example performance results for another example multiplexer configuration in accordance with embodiments of the technology disclosed herein.
Figure 8C:
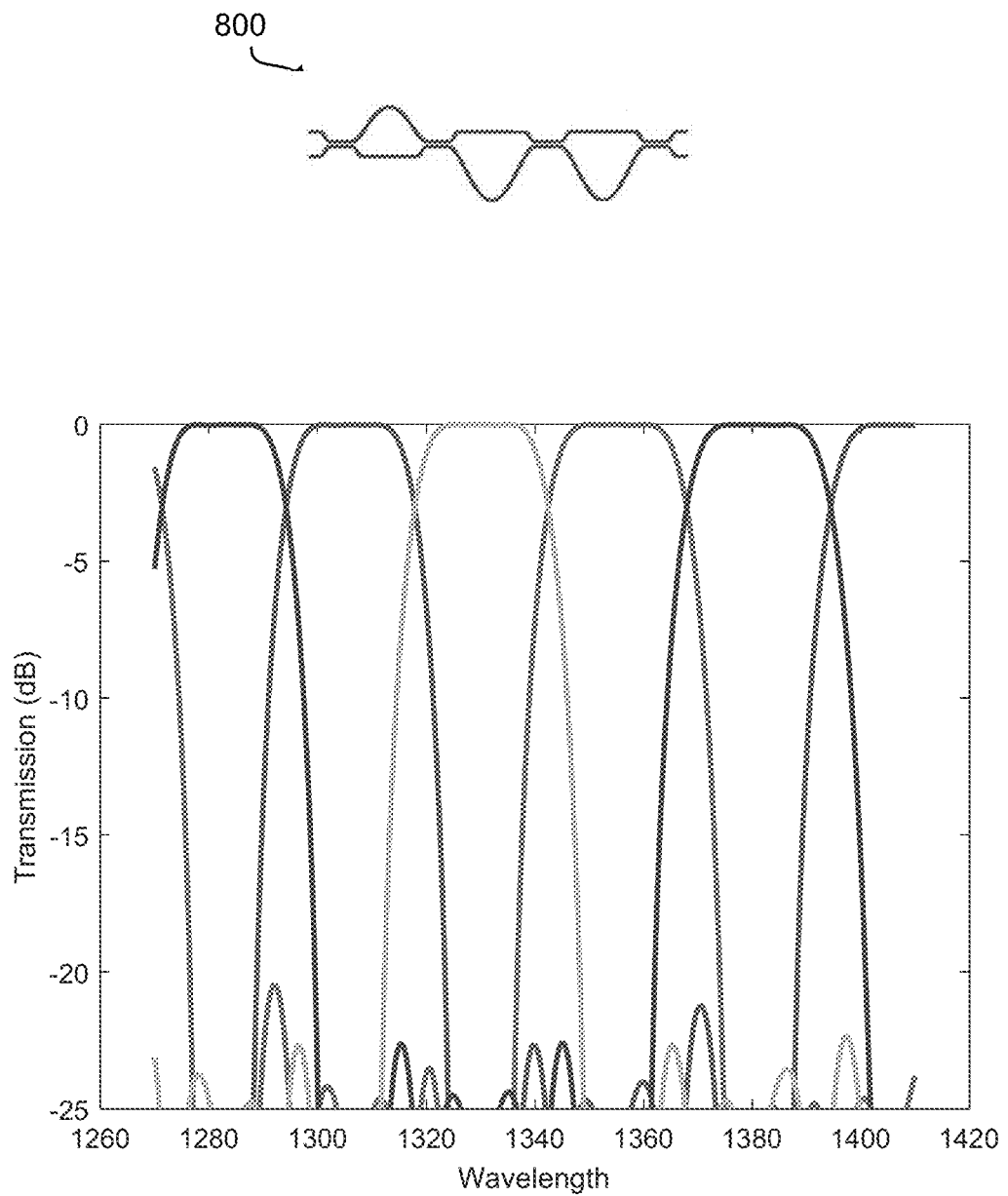
FIG. 8C shows example performance results for another example multiplexer configuration in accordance with embodiments of the technology disclosed herein.

The number of stages of which a filter is comprised, and the total number of stages through which optical signals are passed through, impact the performance of the multiplexers. By passing the signals through levels of filters comprising one or more stages helps to refine the resulting waveform, serving a similar function to that of a band-pass filter to sharpen the waveform. For purposes of illustration only, the following non-limiting example includes optical multiplexer made of silicon nitride and operates between 900 nm and 1065 nm. Under these assumptions, non-limiting examples of performance of different filter configurations are illustrated in FIGS. 8A-8C. FIG. 8A shows the performance for a multiplexer comprising two one-stage filters that output to a single two-stage filer, similar to the configuration of discussed with respect to FIG. 7A. As shown, there is a large amount of cross-talk interference, averaging roughly −11 dB. FIG. 8B shows the performance improvement by substituting the two one-stage filters with two two-stage filters. As can be seen, the cross-talk interference is reduced by passing the signals through a larger number of stages. A further reduction is illustrated in FIG. 8C, which illustrates the results of passing the signals through three three-stage filters, such as three-stage filter 800.

Referring back to FIG. 1A, waveguides 102 may be made of any suitable semiconductor material, such as silicon, silicon dioxide, aluminum oxide, sapphire, germanium, gallium arsenide, indium phosphide, or an alloy of silicon and germanium, among others. In various embodiments, waveguides 102 may be configured as a single-mode waveguide. Waveguides 102 may be planar waveguides, strip waveguides, rib waveguides, or other types of waveguide geometries, in various embodiments. In various embodiments, waveguides 102 may be polarization-independent, capable of operating with optical signals at any polarization. In other embodiments, waveguides 102 may be polarization-dependent, and each VCSEL array 101 may be polarization-locked to properly couple with waveguides 102.

Multiplexed signals 107 output from optical multiplexers 103 and are launched into transmit fibers. In various embodiments, launching couplers 108 may be communicatively coupled by a waveguide to the output of each optical multiplexer 103 and configured to couple each multiplexed signal 107 into a respective transmit fiber. In various embodiments, launching couplers 108 may be configured to launch each multiplexed signal 107 into the lowest-order mode group of a transmit fiber, where the transmit fiber is an MMF. In other words, launching couplers 108 may be configured to launch an optical signal in a single mode, thereby reducing the impact of modal dispersion within an MMF. Launching couplers 108 and optical couplers 106 may be, but are not limited to, gratings, coupling mirrors (metallic-coated, dielectric-coated, etc.), or other optical coupling means.

Figure 2A:
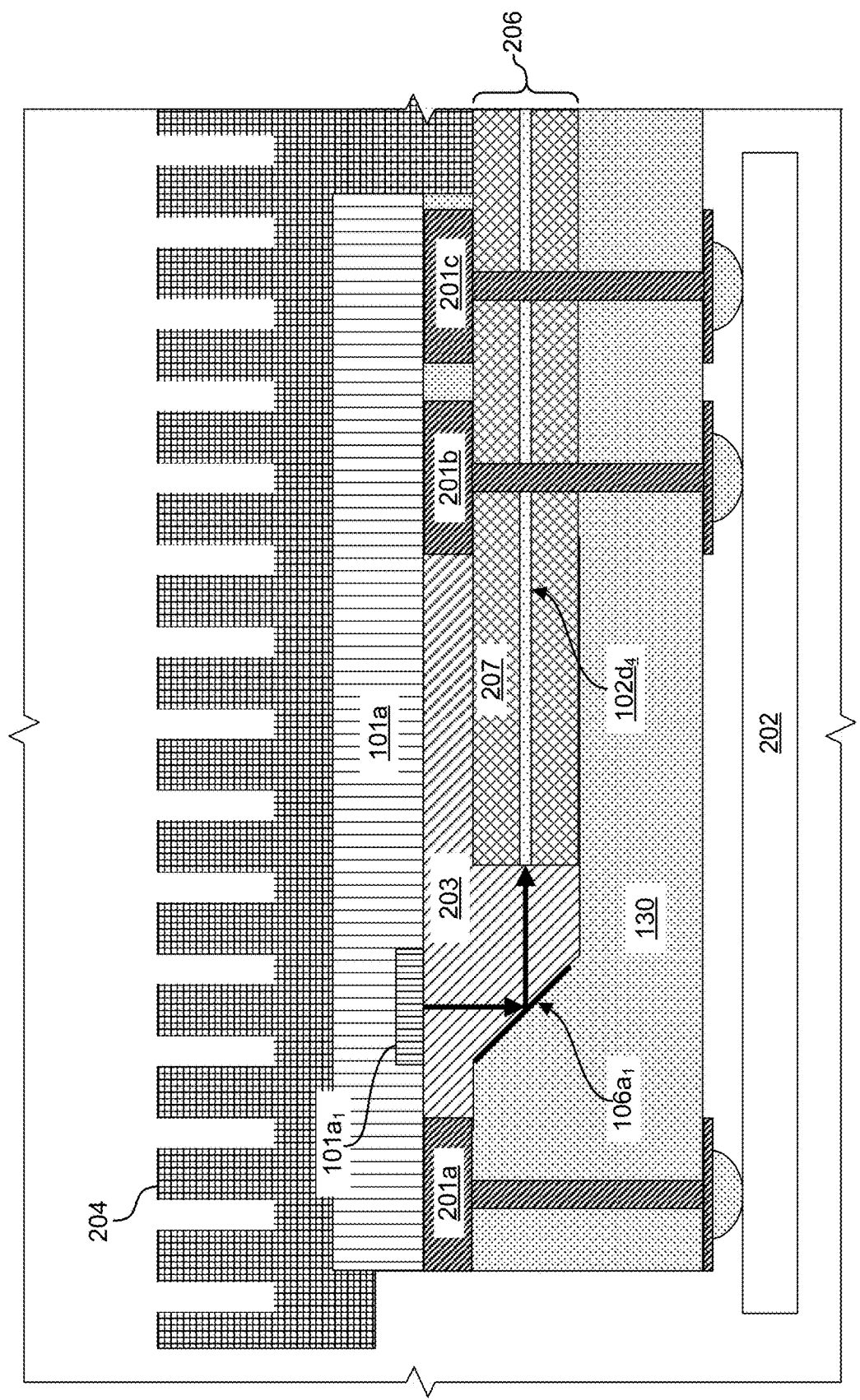
FIG. 2A shows a cross-sectional view illustrating an example optical coupling between a VCSEL array and a waveguide in accordance with embodiments of the technology disclosed herein.
Figure 2B:
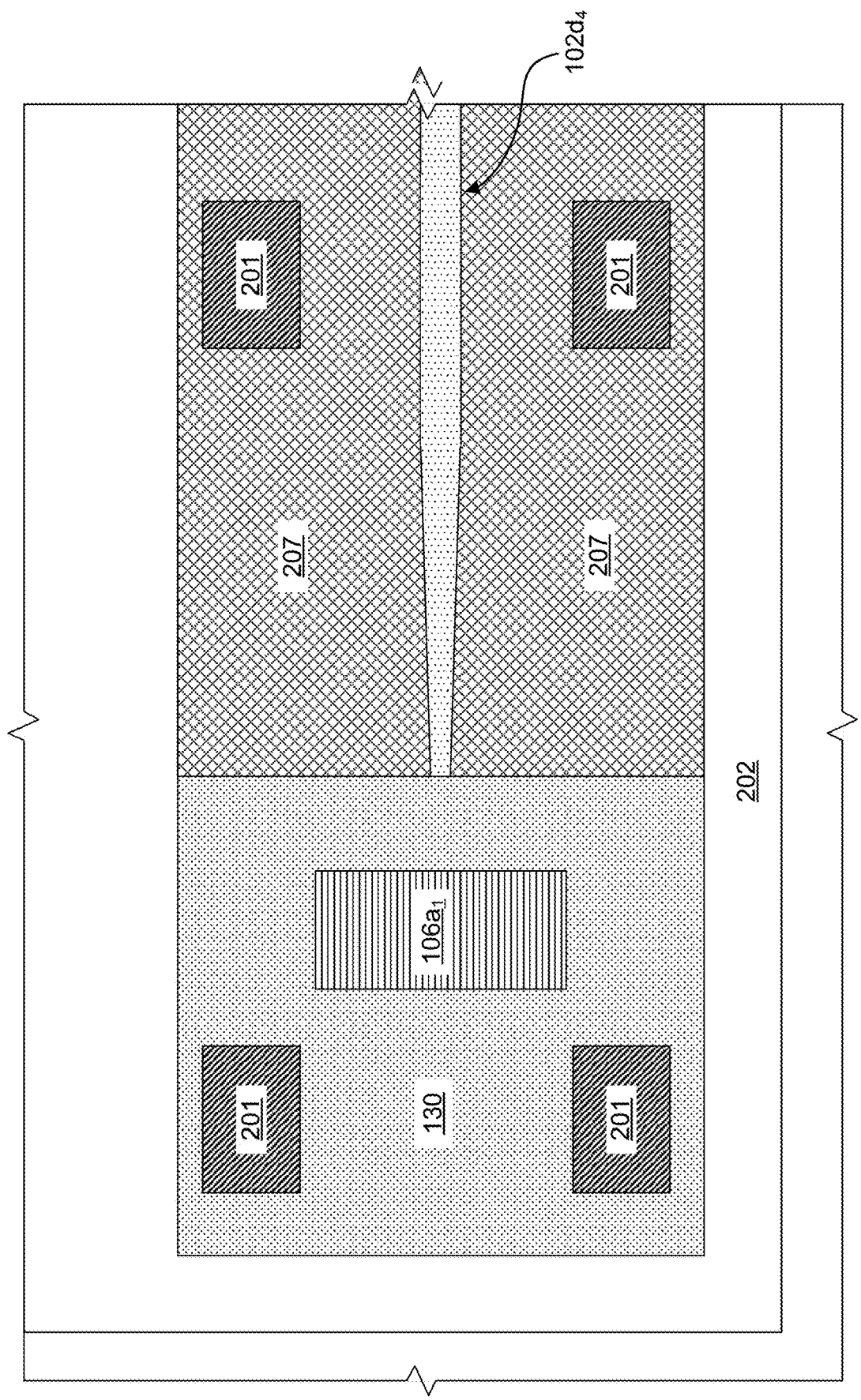
FIG. 2B shows a top view illustrating an example optical coupling between a VCSEL array and a waveguide in accordance with embodiments of the technology disclosed herein.

FIGS. 2A and 2B are cross-sectional and top views, respectively, illustrating example components of the optical coupling from a VCSEL array into a waveguide, in accordance with embodiments of the present disclosure. FIGS. 2A and 2B are provided for illustrative purposes only and should not be interpreted as limiting the scope of the subject matter discussed herein. Use of like references between figures indicates that the description of such like referenced elements apply equally to all instances of the reference. Referring to FIG. 2A, VCSEL array 101a is shown disposed on a plurality of bond pads 201, which provide an electrical connection between VCSEL array 101a and substrate 202. Substrate 202 may be an organic substrate, an inorganic substrate, a semiconductor material, or other suitable material for a printed circuit board (PCB) or other electrical mounting board.

As seen in FIG. 2A, waveguide $102d_4$ may be within mode converter 206. As light is emitted from VCSEL array 101a some diffraction occurs. Mode converter 206 assists in guiding the signal to reduce the impact of light diffraction as the signal travels from VCSEL $101a_1$ to optical coupler $106a_1$, and from optical coupler $106a_1$ to waveguide $102d_4$. In various embodiments, mode converter 206 comprises silicon nitride, silicon dioxide, silicon oxynitride, a polymer or other suitable material or multiple layers of suitable materials encasing waveguide $102d_4$. VCSEL array 101a, mode converter 206 (and, accordingly, waveguide $102d_4$), and optical coupler $106a_1$ are disposed on interposer 130. As illustrated in FIG. 2B, mode converter 206 may be configured such that waveguide $102d_4$ comprises an inverse taper, assisting in mode matching to reduce coupling loss.

Between VCSEL array 101a and waveguide $102d_4$ is disposed index-matched underfill 203. Underfill is helpful in decreasing optical losses by removing the air-waveguide interface. Index-matched underfill 203 is selected to match closely with the index of the optical mode in the waveguide, thereby minimizing optical loss. Heat sink 204 may be included to assist in controlling operational temperature.

The modulated light from VCSEL array 101a is egressed though VCSEL $101a_1$. Optical coupler $106a_1$ couples the modulated light from VCSEL $101a_1$ into the single-mode of waveguide $102d_4$. Although illustrated as a coupling mirror, optical coupler $106a_1$ may be one of the other types of optical couplers discussed above with respect to FIGS. 1A and 1B. As discussed above, in some embodiments VCSEL array 101a may be a single-mode VCSEL array, and waveguide $102d_4$ may include only a single-mode. In this way, only a single-mode optical signal will be sent to optical multiplexers 103 (not shown in FIG. 2A), increasing the possibility of launching into the lowest order mode of any transmit fiber connected (SMF or MMF).

Referring back to FIG. 1A, receiver section 120 is configured to convert received optical signals into electrical signals for processing by one or more system processors. As illustrated, receiver section 120 includes a photodetector array 121 comprising a plurality of optical detectors 122. Photodetector array 121 is configured to receive optical signals directly from an optical connector and converted into electrical signals without the need for polarization-dependent optical devices (e.g., planar routing waveguides for routing received optical signals from the optical connector to optical detectors 122). In some embodiments, optical detectors 122 of photodetector array 121 may be p-i-n photodetectors, avalanche photodetectors, photoconductors, phototransistors, Schottky photodiodes, or uni-traveling carrier (UTC) photodiodes, or other semiconductor-compatible detector devices. In various embodiments, one or more of type of optical detector 122 may be included within photodetector array 121. In various embodiments, photodetector array 121 may include focusing optics to focus the wavelengths into optical detectors 122.

In various embodiments, some of optical detectors 122 may be grouped together into fiber groups 123, associated with each receive fiber connected to optical component 100. After the multiplexed optical signals received over receive fiber are demultiplexed (discussed with respect to FIG. 3), each optical detector 122 of a fiber group 123 may receive light of a particular wavelength. Upon reception, each optical detector 122 is capable of converting the optical signals into electrical signals for use by one or more processors. Generally, silicon photonic optical receivers utilize grating couplers and waveguides to couple the light from the connector to one or more optical-to-electrical converter devices. But grating couplers and waveguides are polarization dependent, requiring the need for polarization diversity devices to address the unknown state of light polarization in the receive fibers. As discussed in detail below with respect to FIG. 3, receiver section 120 may include (either disposed on interposer 130 or included within an optical connector) a demultiplexer capable of demultiplexing unpolarized light or light with unknown state of polarization optical signals for use by optical detectors 122 without the need for additional polarization-dependent routing components. By implementing embodiments of the technology disclosed herein, it is possible to provide a polarization independent receiver for optical signals, reducing the complexity in the receiver.

Figure 3:
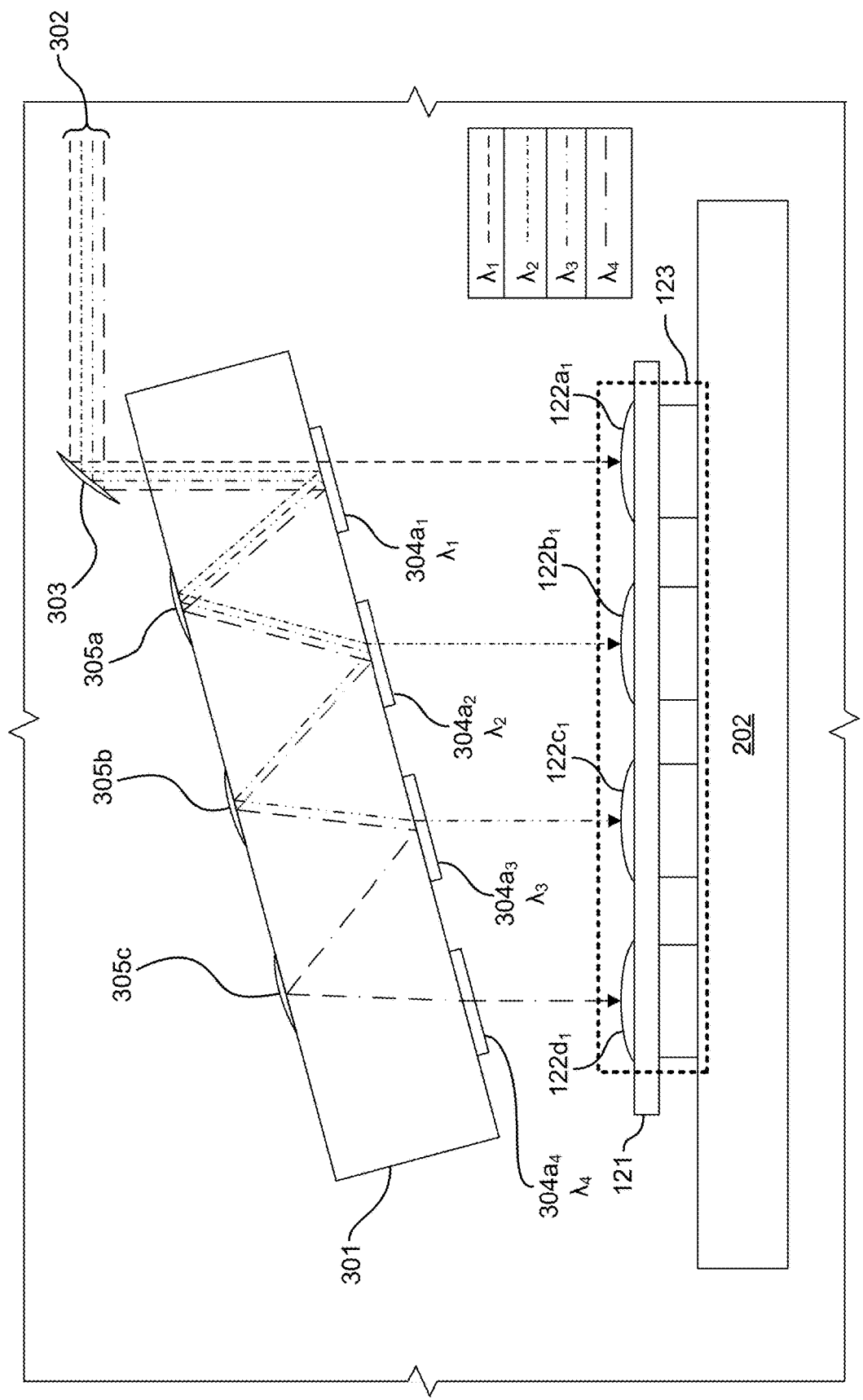
FIG. 3 illustrates an example polarization-independent demultiplexing process in accordance with embodiments of the technology disclosed herein.

FIG. 3 illustrates an example polarization-independent demultiplexing in accordance with embodiments of the technology disclosed herein. As illustrated, a demultiplexer 301 is configured to demultiplex the received multiplexed signal 302. In various embodiments, received multiplexed signal 302 may be multiplexed signals transmitted from another optical transceiver, including but not limited to multiplexed signals 107 discussed with respect to FIGS. 1A and 1B. In some embodiments, demultiplexer 301 may be incorporated within an optical connector, reducing the need for an on-chip demultiplexer in receiver section 120. In other embodiments, demultiplexer 301 may be part of receiver section 120 disposed on interposer 130 to enable receiver section 120 to be capable of handling unpolarized light or light with unknown state of polarization directly from demultiplexer 301 without the need for waveguide routing structures.

As shown in FIG. 3, in various embodiments received optical signal 302 may be received through the connector parallel to substrate 202. In such embodiments, a first directional mirror 303 directs received multiplexed signal 302 into demultiplexer 301. In other embodiments, received multiplexed signal 302 may be received perpendicular to substrate 202, and configured such that received multiplexed signal 302 enters demultiplexer 301 from the optical connector.

Once received multiplexed signal 302 enters demultiplexer 301, a plurality of relay mirrors 305 and a plurality of optical filters 304 are configured to reflect light in a zig-zag propagation. Each optical filter 304 is configured to selectively pass a specific wavelength of light, reflecting other wavelengths back towards the next relay mirror 305. As illustrated, optical filter $304a_1$ is configured to pass $\lambda_1$, optical filter $304a_2$ configured to pass $\lambda_2$, optical filter $304a_3$ configured to pass $\lambda_3$, and optical filter $304a_4$ configured to pass $\lambda_4$. As the reflected light within demultiplexer 301 contacts each optical filter 304, the specific wavelength is permitted to pass to the specific detector 122 within the associated fiber group 123. Because of the construction of demultiplexer 301, each wavelength is output directly to photodetector array 121 without the need to compensate or include additional elements to address polarization issues.

Figure 4A:
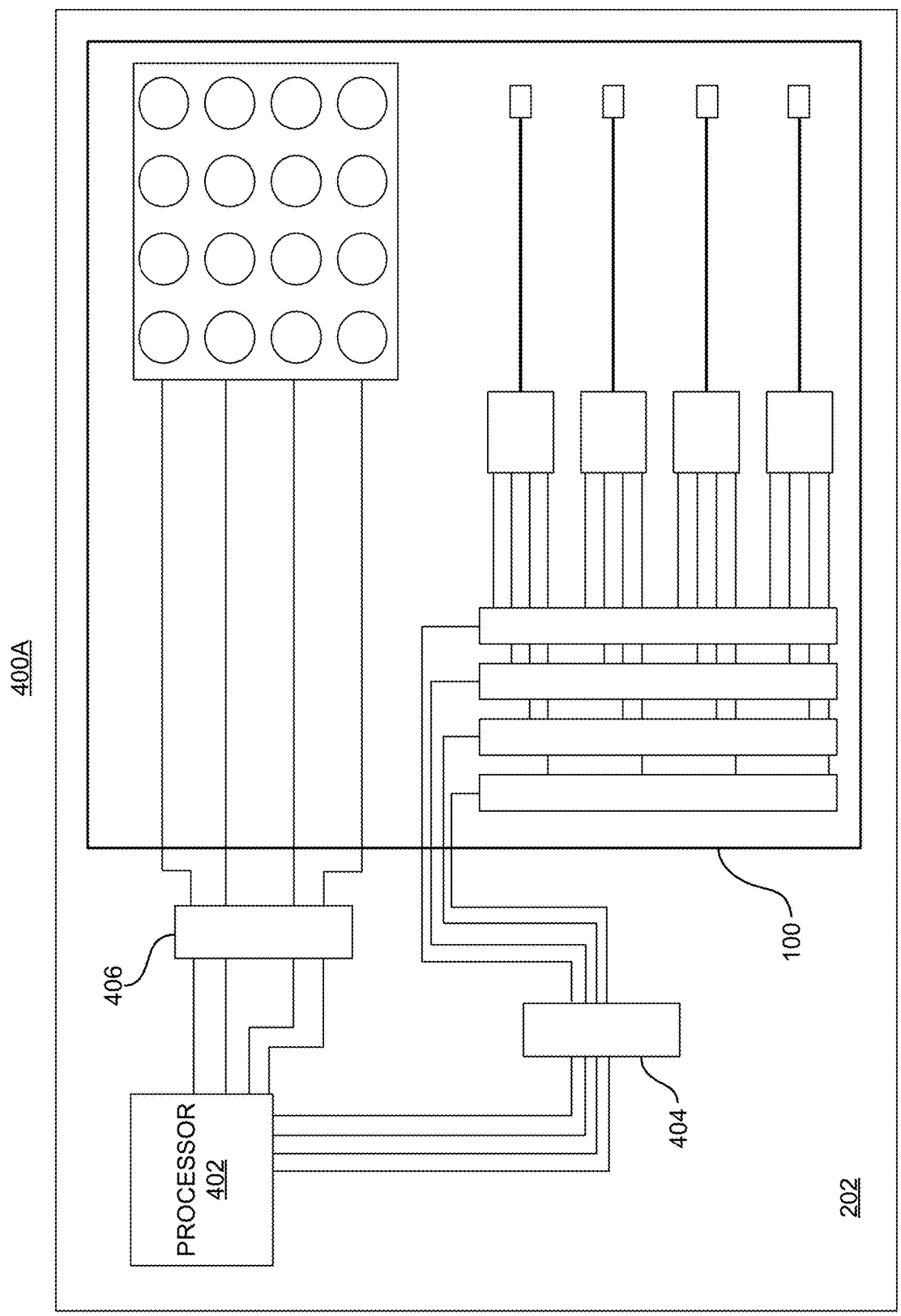
FIG. 4A illustrates an example hybrid transceiver in accordance with embodiments of the technology disclosed herein.

FIG. 4A illustrates an example hybrid transceiver 400A in accordance with embodiments of the technology disclosed herein. Hybrid transceiver 400A is provided for illustrative purposes and should not be interpreted as limiting the scope of the present disclosure to only the example shown in FIG. 4A. Moreover, a person of ordinary skill in the art would understand how to implement additional components commonly used for enabling transceiver functionality (e.g., power components, optical connector components, etc.) that are omitted from FIG. 4A for ease of discussion.

As illustrated in FIG. 4A, optical component 100 is disposed on substrate 202, where substrate 202 may be a PCB configured as a processing board. In various embodiments, optical component 100 may be attached via a plurality of bond pads disposed on substrate 202, while in other embodiments optical component 100 may be connected to electrical traces on substrate 202 by bond wires. In various embodiments, the elements of optical component 100 may be built or grown on substrate 202 such that all of the processing components of hybrid transceiver 400A are part of a single PCB.

Hybrid transceiver 400A may include processor 402 configured to provide electrical data signals for transmission. Non-limiting examples of processor 402 include controllers, application specific integrated circuits (ASICs), programmable logic arrays (PLAs), programmable array logic (PAL), complex programmable logic devices (CPLDs), field-programmable gate arrays (FPGAs), state machines, microprocessors, or other processing devices. In various embodiments, processor 402 may be a central processing unit (CPU), while in other embodiments processor 402 may be a co-processor or other processing acceleration device. Processor 402 may comprise one or more of the different device types identified above.

Processor 402 may be communicatively coupled to receiver elements of optical component 100 through a transimpedance amplifier (TIA) circuit 406. In some embodiments, the output from the receiver section of optical component 100 may need to be amplified to be in a form suitable for processing by processor 402. In various embodiments, a plurality of TIAs may be included within TIA circuit 406, each dedicated to the output of each fiber group within photodetector array of optical component 100, such as the fiber groups 123 discussed above with respect to FIGS. 1A and 1B. In various embodiments, TIA circuit 406 may be included within optical component 100.

Processor 402 may also be communicatively coupled to transmitter elements of optical component 100 through a VCSEL driver circuit 404. VCSEL driver circuit 404 may include a plurality of laser drivers for operating each VCSEL array of optical component 100, such as VCSEL arrays 101 discussed above with respect to FIGS. 1A and 1B. In various embodiment, a separate laser driver is provided for each VCSEL of VCSEL arrays 101, while in other embodiments a separate laser driver is provided for each VCSEL array 101 and configured to drive each VCSEL within the given VCSEL array 101.

Figure 4B:
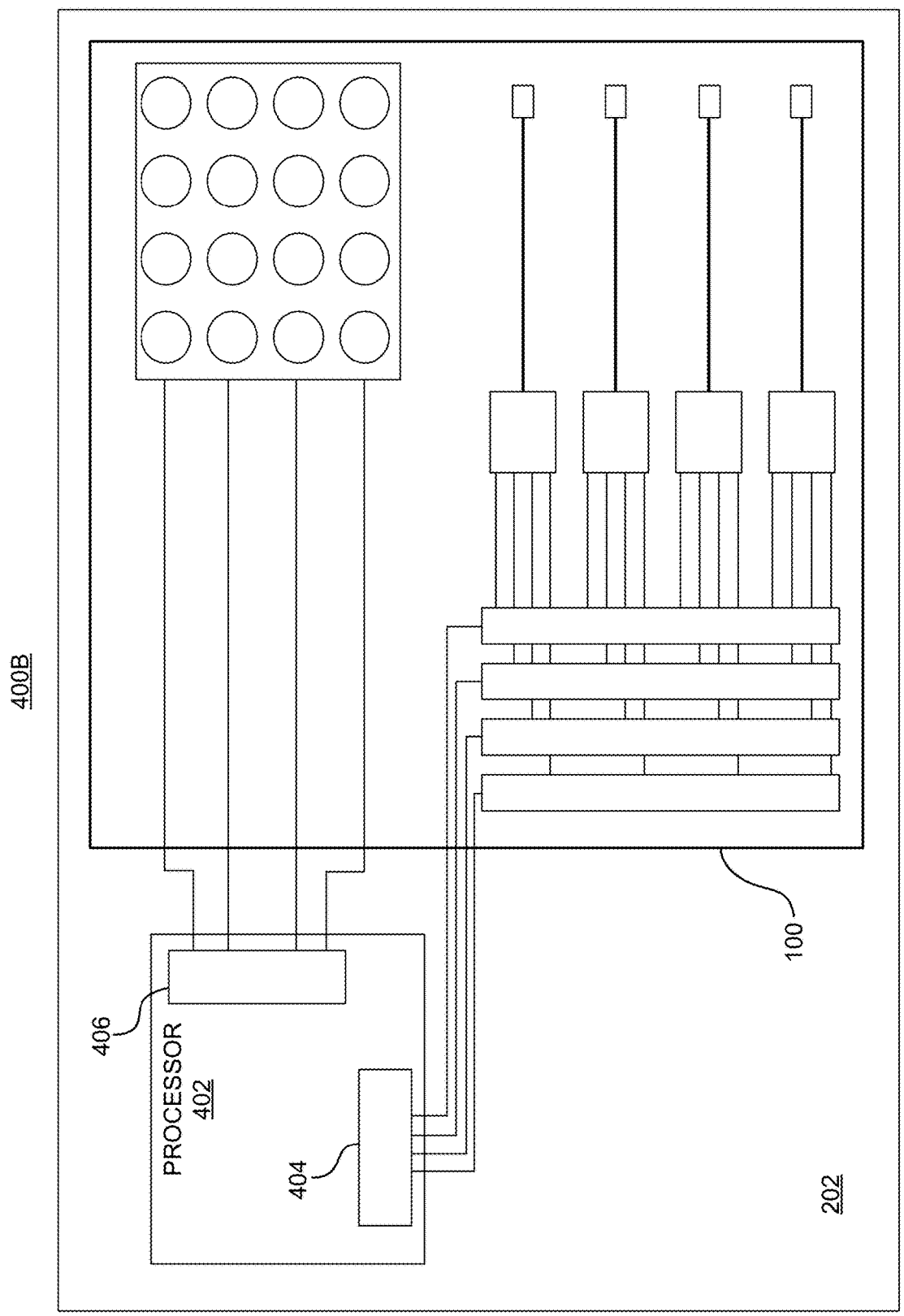
FIG. 4B illustrates another example hybrid transceiver in accordance with embodiments of the technology disclosed herein.

FIG. 4B illustrates another example hybrid transceiver 400B in accordance with embodiments of the technology disclosed herein. As illustrated in FIG. 4B, TIA circuit 406, VCSEL driver circuit 404, and processor 402 are combined into a single component. By implementing these elements as a single component may enable optical component 100 to be placed closer to processor 402, improving performance of the transceiver.

FIG. 4C illustrates another example hybrid transceiver 400C in accordance with embodiments of the technology disclosed herein. As discussed above, receiver section 110 and transmitter section 120 of optical component 100 may be implemented as separate chips. Hybrid transceiver 400C shows optical component 100 comprising a transmitter chip 410 and a receiver chip 420. Transmitter chip 410 and receiver chip 420 may be bonded to interposer 130 of optical component 100 in a manner common in the art for bonding printed circuit boards or other integrated circuit chips. By implementing each section as independent chips, embodiments of the technology herein enables either section to be replaced without impacting the other. As a non-limiting example, receiver chip 410 may be swapped out for a new receiver chip, without the need to refabricate the entire optical component 100 (including the unaffected transmitter section).

Figure 5A:
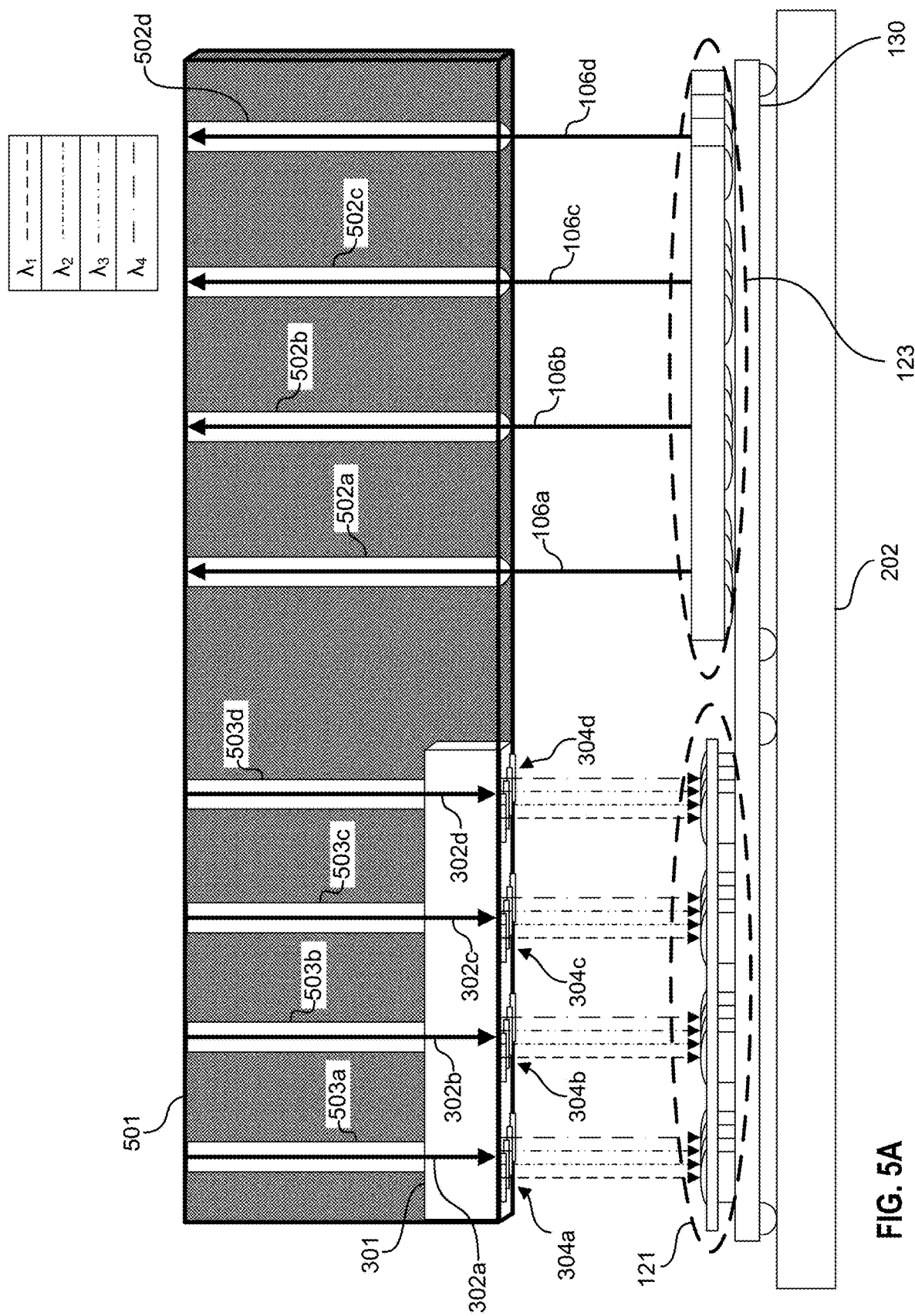
FIG. 5A illustrates the relationship between an example optical component and an example optical connector in accordance with embodiments of the technology disclosed herein.
Figure 5B:
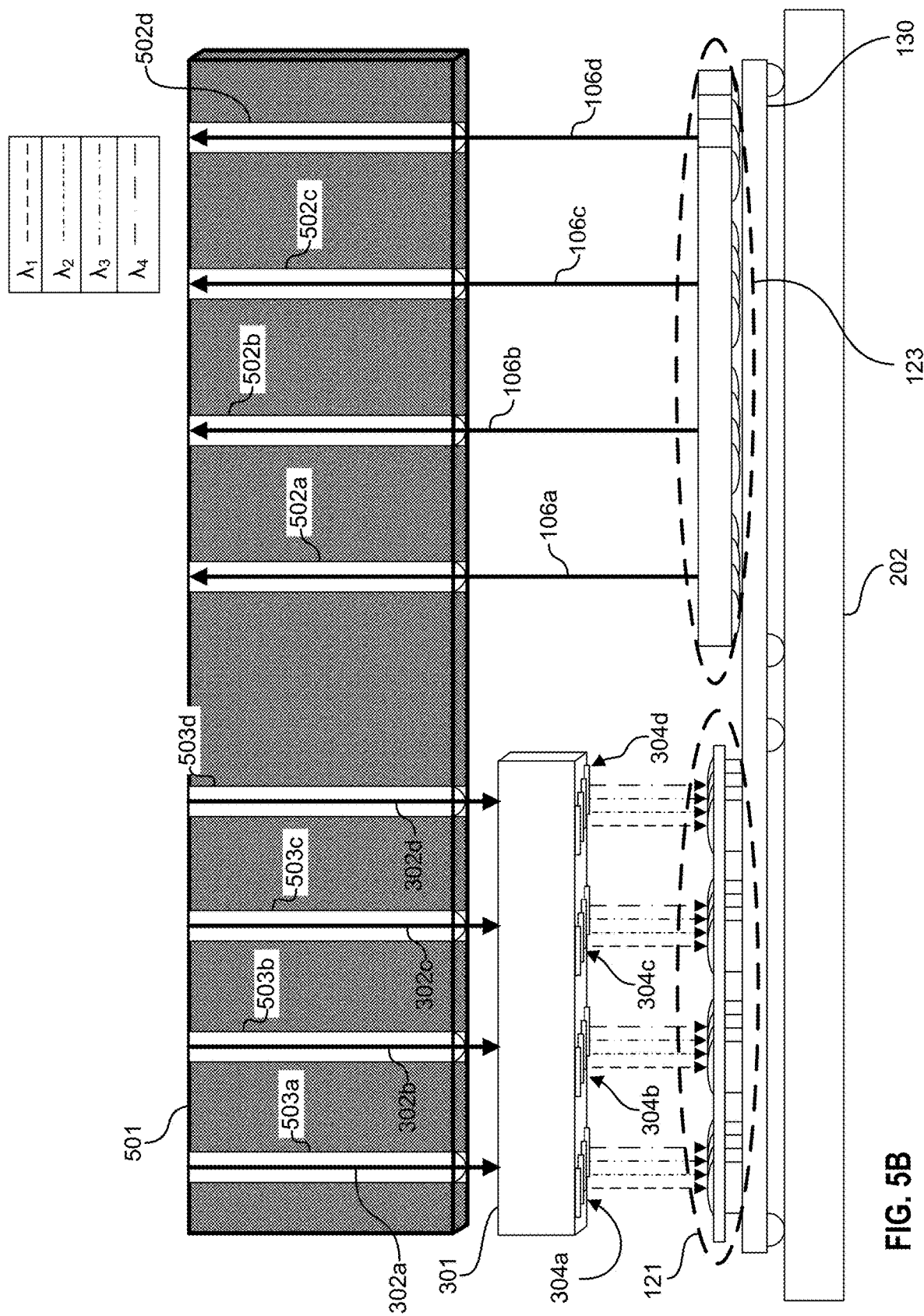
FIG. 5B illustrates the relationship between an example optical component and an example optical connector in another configuration in accordance with embodiments of the technology disclosed herein.

FIG. 5A illustrates the relationship between optical component 100 and an example optical connector 501 in accordance with embodiments of the present disclosure. For ease of discussion, elements of optical component 100 and optical connector 501 are exaggerated and should not be interpreted as limiting the scope of the present disclosure to the arrangement illustrated in FIG. 5A. A person of ordinary skill in the art would understand that additional components (although omitted) would be included in an implementation, such as processor 402 and operational circuits discussed with respect to FIG. 4. Moreover, although demultiplexer 301 is illustrated as being within optical connector 501 this should not be interpreted as limiting the scope of the present disclosure only to embodiments with demultiplexer 301 being part of optical connector 501. As discussed above, in various embodiments demultiplexer 301 may be disposed on interposer 130 in addition to photodetector array 121, as illustrated in FIG. 5B.

As illustrated in FIG. 5A, optical component 100 is configured to receive and/or transmit signals over optical connector 501. In various embodiments, optical component 100 may include a connector socket (not shown in FIG. 5A) configured to mate with optical connector 501 and configured to communicatively couple the elements of optical component 100 discussed with respect to FIGS. 1-4 to optical connector 501. In other embodiments a connector socket may be included on a network device implementing optical component 100, and configured to communicatively couple the elements of optical component 100 discussed with respect to FIGS. 1-4 to optical connector 501. Optical connector 501 comprises a plurality of transmit fibers 502 and a plurality of receive fibers 503. Although illustrated as including eight total fibers (four transmit fibers 502 and four receive fibers 503), a person of ordinary skill in the art would understand that other embodiments of optical connector 501 may include more or fewer optical fibers, depending on the implementation. To add additional fibers, a person of ordinary skill would understand how to add another set of optical detectors to photodetector array 121 and a another set of transmission optics (e.g., additional VCSEL in each VCSEL array 123 and associated optical couplers, waveguides, and optical multiplexers, etc.) without undue experimentation. The number of optical fibers which may be included within optical connector 501 may be determined based on system constraints.

Optical connector 501 further includes demultiplexer 301 in various embodiments. By implementing demultiplexer 301 within optical connector, the receiver section of optical component 100 can be simplified due to the polarization independence provided by demultiplexer 301. This simplifies construction of the receiver section of the hybrid optical transceiver in accordance with embodiments of the present disclosure by eliminating the need for polarization-diversity on the receiver side. As illustrated, each receive fiber 503 has an associated set of optical filters 304 configured to separate out the different wavelengths of light on received multiplex signal 302. In various embodiments, a different number of wavelengths may be included within received multiplexed signal 302 beyond the four wavelengths shown in FIGS. 5A and 5B (as illustrated with reference to the wavelength reference table shown). The number of optical filters 304 required for each receive fiber 403 depends on the number of VCSEL arrays present at the source device from which received multiplexed signals 302 are received.

Figure 6:
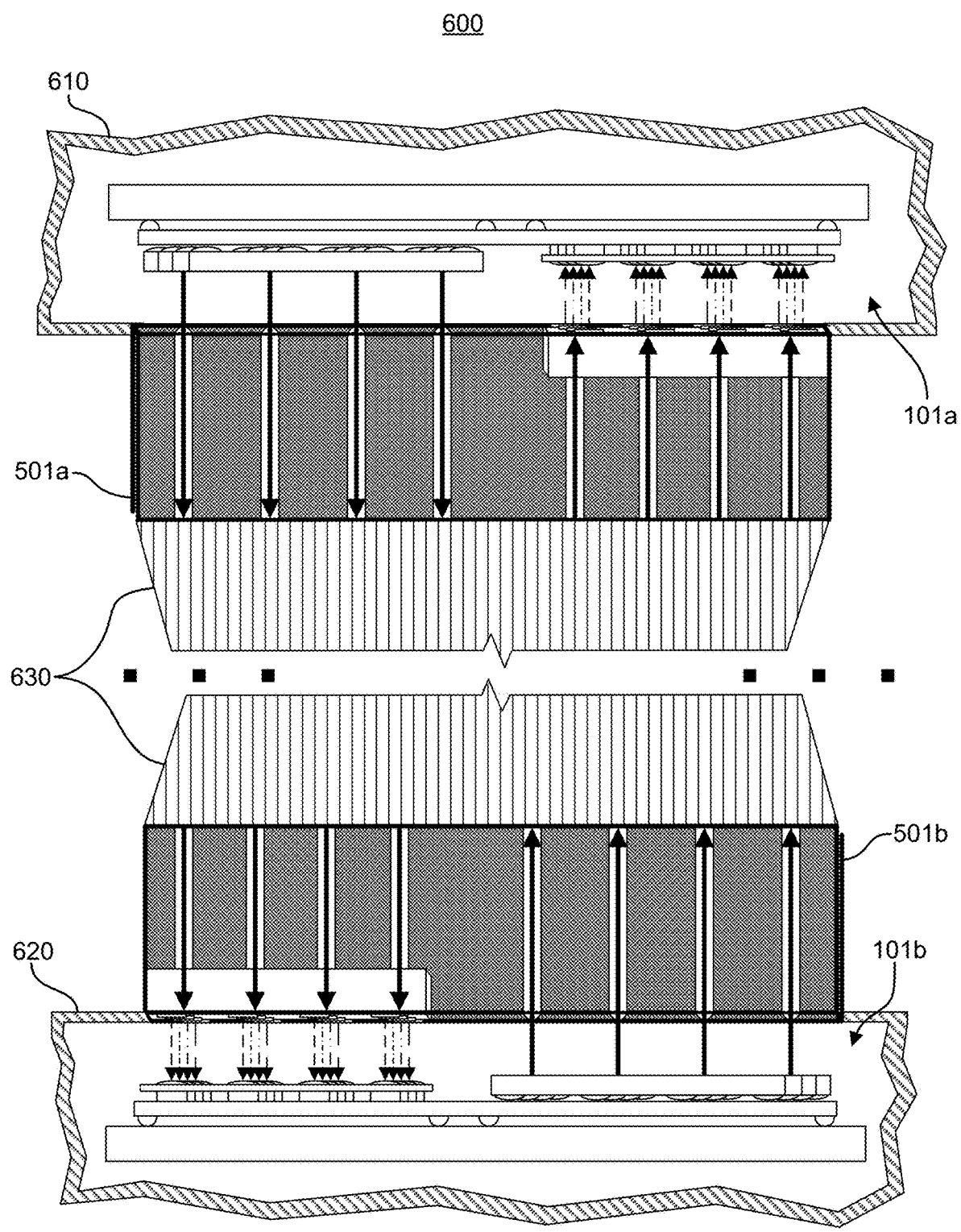
FIG. 6 illustrates an example optical system in accordance with embodiments of the technology disclosed herein.

FIG. 6 illustrates an example optical system 600 in accordance with embodiments of the present disclosure. Optical system 600 comprises two network devices 610, 620, each implementing a version of optical connector 101a, 101b. Each optical connector 501a, 501b may be connected by an optical fiber cable 630 over a distance. As illustrated, multiplexed signals from network device 610 is transmitted to network device 620 over optical fiber cable 630, where the multiplexed signals are received by optical connector 101b and processed in a manner similar to that discussed with respect to FIGS. 1A, 1B, 3, and 4. The reverse transmission scheme occurs in a similar manner from network device 620 to network device 610.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

In common usage, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusively" and "A and B, but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A hybrid optical transceiver, comprising:
a processor disposed on a substrate;
an optical component disposed on the substrate and communicatively coupled to the processor, the optical component comprising a receiver section and a transmitter section;
the transmitter section comprising:
a plurality of vertical cavity surface emitting laser (VCSEL) arrays, each VCSEL array configured to output a modulated light signal at a wavelength different from the other VCSEL arrays;
a plurality of multiplexers, each multiplexer being optically coupled to each VCSEL array and configured to output a multiplexed signal comprising the modulated light signal of each VCSEL array; and
the receiver section comprising:
a photodetector array comprising a plurality of optical detectors, a plurality of subsets of optical detectors configured to detect a wavelength different from the other subsets of optical detectors,
wherein the photodetector array is configured to receive demultiplexed optical signals of unknown polarization without routing waveguides between the photodetector array and a demultiplexer that generates the demultiplexed optical signals.

2. The hybrid optical transceiver of claim 1, the optical component further comprising a plurality of waveguides and a plurality of optical couplers, each optical coupler being configured to couple the modulated light from a VCSEL array into a corresponding waveguide of the plurality of waveguides.

3. The hybrid optical transceiver of claim 2, each optical coupler comprising one of a coupling mirror or a grating coupler.

4. The hybrid optical transceiver of claim 1, each VCSEL array comprising a plurality of VCSELs configured to operate at the wavelength associated with the VCSEL array.

5. The hybrid optical transceiver of claim 1, each multiplexer comprising a one or more of Mach-Zehnder Interferometer (MZI) one-stage filters, two-stage filters, and three stage filters.

6. The hybrid optical transceiver of claim 1, each VCSEL array comprising a single-mode VCSEL array, wherein the modulated light signal output by the VCSEL array comprises a single-mode light signal.

7. The hybrid optical transceiver of claim 1, the optical component further comprising a plurality of waveguides, wherein each VCSEL array and each waveguide are configured to operate in a single-mode.

8. The hybrid optical transceiver of claim 1, the optical component further comprising a plurality of launching couplers, each launching coupler communicatively coupled to an output of one of the plurality of multiplexers and configured to launch the multiplexed signal into a lowest-order mode or lowest-order mode group of an optical fiber cable.

9. The hybrid optical transceiver of claim 1, the plurality of optical detectors comprising one or more of p-i-n photodetectors, avalanche photodetectors, photoconductors, phototransistors, Schottky photodiodes, or uni-traveling carrier photodiodes.

10. The hybrid optical transceiver of claim 1, wherein each subset of optical detectors is associated with a receive fiber of the optical connector.

11. The hybrid optical transceiver of claim 1, wherein:
the receiver section comprises a receiver chip;
the transmitter section comprises a transmitter chip;
the substrate comprises a printed circuit board; and
the receiver chip, the transmitter chip, and the substrate are separate components,
wherein the receiver chip and the transmitter chip are capable of being independently-removable from the substrate.

12. The hybrid optical transceiver of claim 1, wherein each multiplexer comprises silicon nitride.

13. A system, comprising:
a first network device comprising a first hybrid optical transceiver comprising:
a first transmitter section configured to generate a plurality of multiplexed signals; and
a first receiver section comprising a photodetector array;
a second network device comprising a second hybrid optical transceiver comprising:
a second transmitter section configured to generate a plurality of multiplexed signals; and
a second receiver section comprising a photodetector array; and
an optical fiber cable comprising a first optical connector and a second optical connector,
wherein the first optical connector comprises a first demultiplexer configured to separate a plurality of first wavelengths from a plurality of multiplexed signals received from the second network device over the optical fiber cable and to direct the separated first wavelengths to the first receiver without routing waveguides disposed between the first demultiplexer and the first receiver, and
the second optical connector comprises a second demultiplexer configured to separate a plurality of second wavelengths from a plurality of multiplexed signals received from the first network device over the optical fiber cable and to direct the separated second wavelengths to the second receiver without routing waveguides disposed between the second demultiplexer and the second receiver.

14. The system of claim 13, the first transmitter section and the second transmitter section comprising:
a plurality of vertical cavity surface emitting laser (VCSEL) arrays, each VCSEL array configured to output a modulated light signal at a wavelength different from each other VCSEL array;
a plurality of multiplexers, each multiplexer being optically coupled to each VCSEL array and configured to output a multiplexed signal comprising the modulated light signal of each VCSEL array.

15. The system of claim 14, the first transmitter section and the second transmitter section comprising:
a plurality of waveguides and a plurality of optical couplers, each optical coupler being configured to couple the modulated light from a VCSEL array into a corresponding waveguide of the plurality of waveguides.

16. The system of claim 15, each optical coupler comprising one of a coupling mirror or grating coupler.

17. The system of claim 13, the first receiver section and the second receiver section comprising a photodetector array comprising a plurality of optical detectors, a plurality of subsets of optical detectors configured to detect a wavelength different from the other subsets of optical detectors.

18. The system of claim 17, the plurality of optical detectors comprising one or more of p-i-n photodetectors, avalanche photodetectors, photoconductors, phototransistors, Schottky photodiodes, or uni-traveling carrier photodiodes.

19. The system of claim 13, wherein the first demultiplexer and the second demultiplexer comprises a plurality of coarse wavelength division multiplexing (CWDM) filters, each CWDM filter configured to pass one wavelength of a plurality of wavelengths within the multiplexed signals.

20. A optical component enabling hybrid optical transmission and reception, comprising:
- a plurality of vertical cavity surface emitting laser (VCSEL) arrays, each VCSEL array comprising a plurality of VCSELs configured to operate at a wavelength different from each VCSEL of the other VCSEL arrays;
- a plurality of waveguides and a plurality of optical couplers, each optical coupler being configured to couple the modulated light from a VCSEL array into a corresponding waveguide of the plurality of waveguides;
- a plurality of multiplexers, each multiplexer being optically coupled to an output of a plurality of waveguides and configured to output a multiplexed signal comprising the modulated light signal of each VCSEL array output by the respective plurality of waveguides; and
- a photodetector array comprising a plurality of optical detectors, a plurality of subsets of optical detectors configured to detect a wavelength different from the other subsets of optical detectors,
- wherein the photodetector array is configured to receive demultiplexed optical signals of unknown polarization without routing waveguides between the photodetector array and a demultiplexer that generates the demultiplexed optical signals.

* * * * *